United States Patent [19]
Bedford et al.

[11] Patent Number: 5,976,414
[45] Date of Patent: Nov. 2, 1999

[54] NON-PHOSPHORUS CORROSION INHIBITOR PROGRAM FOR AIR WASHER SYSTEM

[75] Inventors: Binaifer S. Bedford; Daniel A. Meier, both of Naperville, Ill.

[73] Assignee: Nalco Chemical Company, Naperville, Ill.

[21] Appl. No.: 08/957,614

[22] Filed: Oct. 24, 1997

Related U.S. Application Data

[63] Continuation-in-part of application No. 08/647,681, May 15, 1996, abandoned.

[51] Int. Cl.$^6$ .................................................. C09K 3/00
[52] U.S. Cl. ................. 252/388; 252/389.3; 252/389.62; 252/396; 422/17; 422/18
[58] Field of Search ................................. 252/388, 389.3, 252/389.62, 396; 422/17, 18

[56] References Cited

U.S. PATENT DOCUMENTS

| | | |
|---|---|---|
| 3,556,202 | 1/1971 | Stockford et al. . |
| 3,711,246 | 1/1973 | Foroulis . |
| 3,939,080 | 2/1976 | Martin . |
| 3,984,731 | 10/1976 | Martin . |
| 4,217,216 | 8/1980 | Lipinski . |
| 4,237,090 | 12/1980 | DeMonbrun et al. . |
| 4,279,768 | 7/1981 | Busch . |
| 4,303,568 | 12/1981 | May et al. . |
| 4,490,308 | 12/1984 | Fong et al. . |
| 4,546,156 | 10/1985 | Fong et al. . |
| 4,566,973 | 1/1986 | Masler, III et al. . |
| 4,604,431 | 8/1986 | Fong et al. . |
| 4,640,793 | 2/1987 | Persinski et al. . |
| 4,678,840 | 7/1987 | Fong et al. . |
| 4,680,339 | 7/1987 | Fong . |
| 4,703,092 | 10/1987 | Fong . |
| 4,744,949 | 5/1988 | Hoots et al. . |
| 4,752,443 | 6/1988 | Hoots et al. . |
| 4,756,881 | 7/1988 | Hoots et al. . |
| 4,762,894 | 8/1988 | Fong et al. . |
| 4,777,219 | 10/1988 | Fong . |
| 4,801,388 | 1/1989 | Fong et al. . |
| 4,862,950 | 9/1989 | Gribble et al. . |
| 4,898,686 | 2/1990 | Johnson et al. . |
| 4,923,634 | 5/1990 | Hoots et al. . |
| 4,925,568 | 5/1990 | Morse . |
| 4,929,425 | 5/1990 | Hoots et al. . |
| 4,961,878 | 10/1990 | Mullins . |
| 5,034,155 | 7/1991 | Soeder et al. . |
| 5,035,806 | 7/1991 | Fong et al. . |
| 5,118,681 | 6/1992 | Amick et al. . |
| 5,120,797 | 6/1992 | Fong et al. . |
| 5,143,622 | 9/1992 | Fong et al. . |
| 5,179,173 | 1/1993 | Fong et al. . |
| 5,259,985 | 11/1993 | Nakanishi et al. . |
| 5,308,498 | 5/1994 | Fong et al. . |
| 5,507,861 | 4/1996 | Caupin et al. ........................... 252/388 |
| 5,578,246 | 11/1996 | Beardwood ........................ 252/389.62 |
| 5,589,106 | 12/1996 | Shim et al. . |
| 5,614,268 | 3/1997 | Varley et al. ............................ 252/388 |
| 5,683,654 | 11/1997 | Dallmir et al. . |

FOREIGN PATENT DOCUMENTS

| | | |
|---|---|---|
| 140519 | 8/1985 | European Pat. Off. . |
| 60-86286 | 5/1985 | Japan . |
| 62-280381 | 12/1987 | Japan . |

OTHER PUBLICATIONS

1990:597522, Study on Efficiency of Chlorine Dioxide as Bactericide, H. Shijie Shanghi Petrochem. Coll., Schanghi, Peop. Rep. China 31(2), 85–7.

*Primary Examiner*—Philip Tucker
*Attorney, Agent, or Firm*—Kelly L. Cummings; Thomas M. Breininger

[57] ABSTRACT

The prevention of corrosion on the surfaces of airwasher systems and particularly systems containing low levels of hardness is controlled utilizing a corrosion inhibiting amount of a composition including an alkali metal silicate, a hydroxycarboxylic acid or its water soluble salts, a polyacrylate or its water soluble salts, and a water soluble polymer which acts as a dispersant. Superior corrosion inhibition is achieved using the compositions of this invention as corrosion inhibitors, particularly in industrial airwasher systems employing mild steel metallurgy.

12 Claims, 9 Drawing Sheets

NON-PHOSPHORUS CORROSION INHIBITOR PROGRAM FOR AIR WASHER SYSTEM

The present application is a continuation-in-part of Ser. No. 08/647,681 filed May 15, 1996 now abandoned by Binaifer S. Khambatta and Daniel A. Meier entitled "A Non-Phosphorus Corrosion Inhibitor Program for Industrial Cooling Water Systems and Airwasher Systems", the disclosure of which is incorporated herein by reference.

BACKGROUND OF THE INVENTION

Airwasher systems, predominantly found in textile, electronics, pharmaceutical, and tobacco industries, provide humidity and temperature control in such plants. During the winter, airwasher systems increase the humidity in circulated air and during the summer, airwasher systems dehumidify recycled air. The removal of dust, odors, and particulates from the circulated air is another important function of air filtration and airwasher systems.

The most common design of an airwasher system is the vertical airwasher. Another system design still being used is the horizontal airwasher. Regardless of the design, airwasher systems have common features such as the basin, spray header trees and nozzles, and eliminator blades.

While a variety of problems can occur in the operation of airwasher systems, the most serious are poor corrosion control, where corrosion products can clog the spray headers, resulting in decreased airwasher efficiency. Other factors that can lead to spray nozzle plugging, specifically in the textile industry, include contaminants such as lint, cotton fibers and sizing agents such as polyvinyl alcohol, starches, waxes, and the like. An additional problem in such systems is the fouling of the equipment caused by microbiological activity.

Water soluble polymers such as polyacrylic acid have been utilized as additives to disperse solids contained in industrial cooling water systems and as an aid to prevent the adherence of scale on the metallic surfaces of such systems in contact with water. Likewise, biocides have been added to control the formation of microbiological growth in industrial systems. The presence of microbiological growth can provide a location where corrosion can occur, underneath the deposit and where water flow is minimal and untreated.

However, due to the pending environmental regulations and restrictions, a non-metal, non-phosphorus corrosion inhibiting program is needed for use in the industries that typically employ airwasher systems.

Shim et al., U.S. Pat. No. 5,589,106 discloses compositions for preventing corrosion of metallic surfaces in contact with industrial cooling water comprising: a hydrocarboxylic acid or its water soluble salts, a water-soluble alkali metal silicate, a water-soluble dispersant polymer, and optionally other corrosion inhibitors and biocides. Persinski et al., U.S. Pat. No. 4,640,793 discloses synergistic compositions which act as scale and corrosion inhibitors comprising two water-soluble polymers.

Neither Shim et al. nor Persinski et al. describes a composition for the treatment of air washer systems as described by this invention. There are several differences between cooling water systems and air washer systems, notably their uses. The main purpose of a cooling water surface is to remove heat from a surface, typically a heat exchanger, and then reject that heat to the environment, while the main purpose of an air washer is to condition the environment of the workspace. This would include both temperature and humidity control. The water of an air washer system is used to reject heat to an air conditioning machine, which is the opposite of what occurs in a cooling water system.

Another difference between the two types of systems concerns their respective methods of operation. Air washers operate in two distinct modes depending upon the season of operation. Typically during the winter, the water will evaporate and concentrate similar to a cooling water system. This occurs to increase the humidity in the work space. In the summer (higher humidity season), the water will 'deconcentrate' as water is pulled from the atmosphere to reduce the humidity of the work space. The variability of water chemistry conditions that occurs due to seasonal variations is in contrast to cooling water systems that evaporate water to reject heat and are consistently at a higher cycle of concentration.

Furthermore, air washer systems are designed to scrub/clean material from the work space atmosphere, while cooling towers are designed to remove heat from a process. During this process, inadvertent contamination from the airborne contaminants occurs. Because of this design, any air washer treatments must be able to control a larger amount of airborne contaminants. For example, textile air washers will contain natural or synthetic fiber contaminants, tobacco air washers will contain tobacco dust, and electronics air washers will contain organic solvents which must be removed. Such contaminants are typically not found in cooling water systems.

The main treatment for cooling water systems is geared towards corrosion/fouling control on a heat transfer system. This is in contrast to air washer treatments being geared towards dispersancy of airborne contaminants and corrosion control of non-heat transfer surfaces. As described above, there are numerous differences between the two types of systems. In industrial water treatment, each system has a unique set of problems which can be overcome by the selection of an appropriate treatment. Since the two systems are different, a treatment suitable for one system would not also necessarily be suitable for the other. (For example, one would not use a boiler treatment program in a cooling tower where they may both be considered industrial water applications.)

Bush, U.S. Pat. No. 4,279,768 discloses a composition for removing scale built up on metallic working surfaces utilizing a synergistic blend of a chelant, polymeric conditioners, a gluconate, a triazole and sodium sulfite. Mullins, U.S. Pat. No. 4,961,878 discloses a composition of inhibiting metal corrosion in a closed aqueous cooling system which may include acrylate polymer, tolyltriazole, amine oxide and silicate.

However, neither the '878 compositions nor the '768 compositions are useful for addressing the specific problems associated with air washer systems solved by the invention described herein. The inherent differences between the two systems as described above indicate that it is not necessarily true that effective treatments for cooling water systems would be equally effective in air washer systems.

It is accordingly an object of this invention to provide to the art a novel, non-metal, non-phosphorus, high performance chemical corrosion inhibition treatment program which can be used in airwasher systems to help prevent the corrosion of the metal surfaces in contact with the water contained in such system. The corrosion inhibitors of this invention have been found to be particularly effective in preventing corrosion from occurring on the iron, mild steel, yellow metals, and galvanized steel surfaces of airwasher systems in contact with industrial cooling water.

SUMMARY OF THE INVENTION

This invention relates to a method for the prevention of corrosion on metallic surfaces, including those surfaces made of iron, mild steel, yellow metals, and galvanized steel, of airwasher systems which are in contact with alkaline cooling aqueous fluids (pHs from about 7 and higher). The method encompasses adding to the aqueous fluid contained in such a system an effective corrosion inhibiting amount of a multi-component composition comprising:

a. from about 2 to about 50 percent by weight of an organic acid;
 b. from about 2 to about 50 percent by weight of a water soluble alkali metal or silicate salt;
 c. from about 1 to about 30 percent by weight of a scale inhibitor; and,
 d. the balance thereof being water.

Other additives may be added to the composition depending on its intended use and application. For instance, a biocide may be added to control the growth of microorganisms in the system. Other additives, such as substantially inert inorganic materials and fluorescent dyes, and the like may also be employed as tracer materials in conjunction with the application of the cooling water corrosion inhibitors of this invention to airwasher systems. (By the terms "substantially inert" and "inert", it is meant that the compound (tracer) is not appreciably or significantly affected by any other chemistry in the system, or by other system parameters such as metallurgical composition, heat changes or heat content. Such compounds are not degraded by or deposited within the fluid system. This is termed an inert compound, inert to the system equipment and all chemistry in the system, so that the inert compound moves through the system unscathed and not altered to any significant or meaningful extent. The inert compounds used herein subscribe to the practical analytical chemistry requirement of loss equal to or less than 10%.)

One of the particular advantages of the corrosion inhibiting system described herein is that it is devoid of regulated heavy metal components, and contains no phosphate component. As such, the treatment proposed herein may be considered more environmentally acceptable in certain areas than prior art treatment compositions containing either heavy metal components, and/or phosphate materials.

DESCRIPTION OF THE INVENTION

Figure 1:
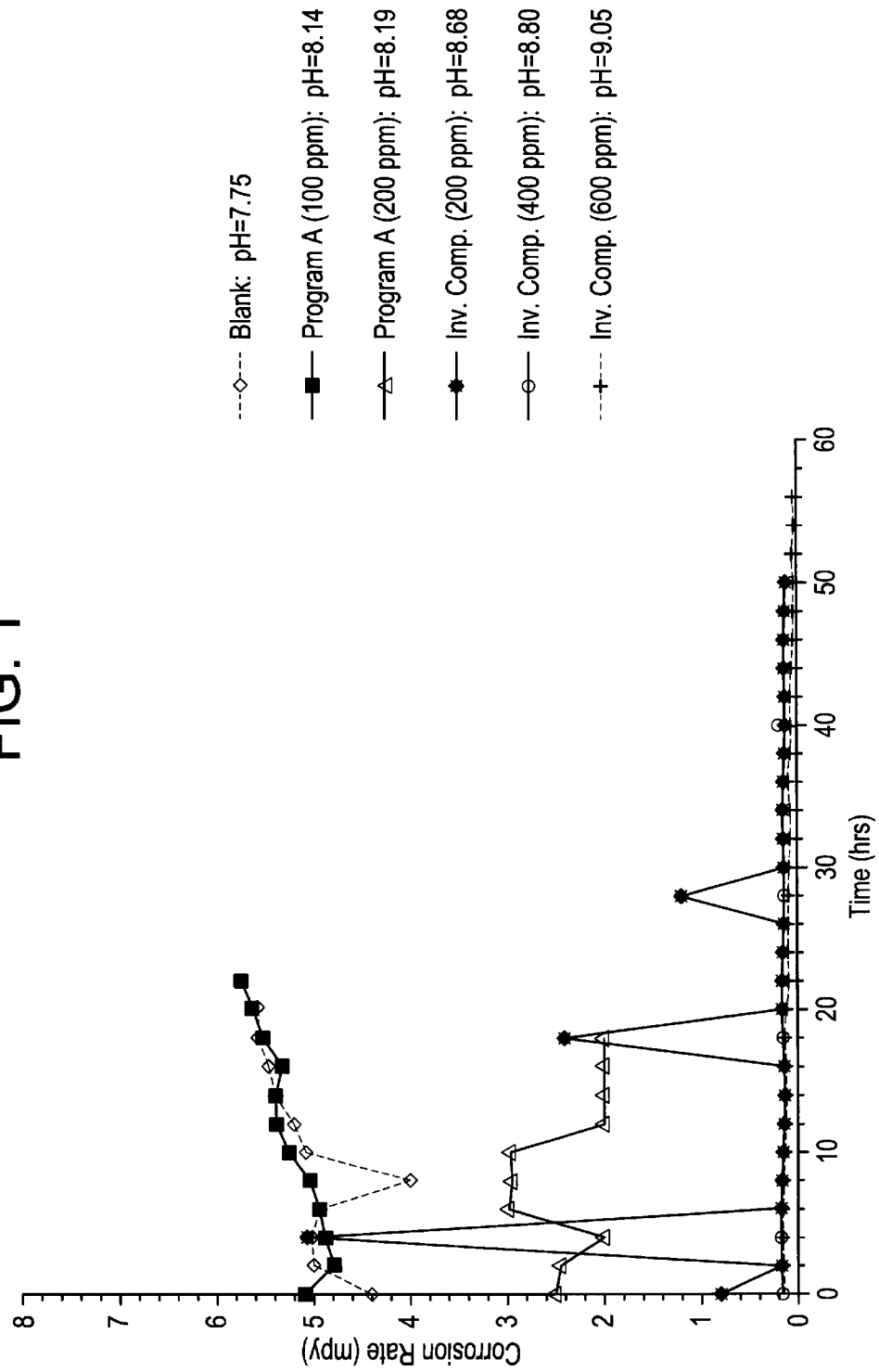
FIG. 1: A line graph showing the mild steel corrosion rates of a blank (water), the invention composition (Inv. Comp.) and Program A.

One aspect of the invention is a multi-component composition for inhibiting corrosion on metallic surfaces of air washer systems in contact with an aqueous fluid which comprises adding to such fluid an effective corrosion controlling amount of a composition comprising:

a. from about 2 to about 50 percent by weight of an organic acid selected from the group consisting of: adipic acid, gluconic acid, succinic acid, tartaric acid, maleic acid, lactic acid, citric acid, benzoic acid, mono-, di-, and tri-substituted benzoic acid, phthalic acid, terephthalic acid, isophthalic acid, malonic acid, mixtures thereof, and water soluble salts thereof;
 b. from about 2 to about 50 percent by weight of a water soluble alkali metal or silicate salt calculated as $SiO_2$;
 c. from about 1 to about 30 percent by weight of at least one scale inhibitor selected from the group consisting of: polyacrylic acid; water soluble anionically charged polymers having a molecular weight of from about 500 to about 15,000; mixtures thereof; and water soluble salts thereof; and,
 d. the balance thereof being water.

While the preferred amount of an organic acid used in the composition is from about 2 to about 50 percent by weight, a more preferred range is from about 5 to about 40 percent by weight, and a most preferred range is from about 10 to about 30 percent by weight.

The preferred range of a water soluble alkali metal or silicate salt in the composition is from about 2 to about 50 percent by weight, more preferably from about 5 to about 40 percent by weight, and most preferably from about 10 to about 30 percent by weight.

The total amount of scale inhibitor in the composition is from about 1 to about 30 percent by weight, more preferably from about 2 to about 20 percent by weight, and most preferably from about 3 to about 15 percent by weight. The molecular weight of the water soluble anionically charged polymers used as scale inhibitors is preferably from about 500 to about 15,000, more preferably from about 750 to about 10,000, and most preferably from about 1,500 to about 7,500. In some embodiments, at least one scale inhibitor may be polyacrylic acid.

In addition, from about 0.5 to about 25 percent by weight of a dispersant may be added to the composition wherein the dispersant, being different from the scale inhibitor, is a water soluble anionically charged polymer having a molecular weight of from about 13,000 to about 40,000. A more preferred range of dispersant in the composition is from about 1 to about 20 percent by weight, and most preferred from about 2 to about 10 percent by weight. A more preferable molecular weight of the dispersant is from about 15,000 to about 30,000, and most preferably from about 18,000 to about 20,000

Alternatively, from about 0.1 to about 10 percent by weight of a substituted azole selected from the group consisting of: butyl benzyl triazole; tolyl triazole; mercaptobenzothiazole; and, benzotriazole, may be added to the composition. A more preferred range of a substituted azole is the composition is from about 0.5 to about 7 percent by weight, and most preferred range is from about 0.75 to about 4.5 percent by weight.

If deemed desirable, from about 1 to about 50 percent by weight of an alkali metal hydroxide calculated as NaOH may be added to the composition. A more preferred range is from about 2 to about 40 percent by weight, and most preferred range is from about 5 to about 30 percent by weight.

Another aspect of the invention is the addition of from about 0.5 to about 25 percent by weight of a dispersant, wherein the dispersant, being different from the scale inhibitor, is a water soluble anionically charged polymer having a molecular weight of from about 13,000 to about 40,000, and from about 0.1 to about 10 percent by weight of a substituted azole selected from the group consisting of: butyl benzyl triazole, tolyl triazole, mercaptobenzothiazole, and, benzotriazole to the composition.

An alternate aspect of the invention may include the addition from about 0.5 to about 25 percent by weight of a dispersant, wherein the dispersant, being different from the scale inhibitor, is a water soluble anionically charged polymer having a molecular weight of from about 13,000 to about 40,000, from about 0.1 to about 10 percent by weight of a substituted azole selected from the group consisting of: butyl benzyl triazole, tolyl triazole, mercaptobenzothiazole, and, benzotriazole, and from about 1 to about 50 percent by weight of an alkali metal hydroxide calculated as NaOH to the composition.

The dispersant which can be added to the composition may be selected from polymers consisting of methyl sulfonic acid acrylamide, acrylic acid, and, aminomethanesulfonate. The composition may contain additional ingredients selected from the group including: substantially inert tracer, anti-foam compound, surfactant; and, biocide. The water soluble silicate salt added to the composition may be sodium silicate.

Another aspect of the invention is a method for the control of corrosion on metallic surfaces in contact with an aqueous fluid of an airwasher system which comprises adding and maintaining in the aqueous fluid of said airwasher system an effective corrosion controlling amount of the composition comprising:

a. from about 2 to about 50 percent by weight of an organic acid selected from the group consisting of: adipic acid, gluconic acid, succinic acid, tartaric acid, maleic acid, lactic acid, citric acid, benzoic acid, mono-, di-, and tri-substituted benzoic acid, phthalic acid, terephthalic acid, isophthalic acid, malonic acid, mixtures thereof; and water soluble salts thereof;

b. from about 2 to about 50 percent by weight of a water soluble alkali metal or silicate salt calculated as $SiO_2$;

c. from about 1 to about 30 percent by weight of at least one scale inhibitor selected from the group consisting of: polyacrylic acid; water soluble anionically charged polymers having a molecular weight of from about 500 to about 15,000; mixtures thereof; and water soluble salts thereof; and, d. the balance thereof being water.

While the preferred amount of an organic acid used in the composition is from about 2 to about 50 percent by weight, a more preferred range is from about 5 to about 40 percent by weight, and a most preferred range is from about 10 to about 30 percent by weight.

The preferred range of a water soluble alkali metal or ammonium silicate salt in the composition is from about 2 to about 50 percent by weight, more preferably from about 5 to about 40 percent by weight, and most preferably from about 10 to about 30 percent by weight.

The total amount of scale inhibitor in the composition is from about 1 to about 30 percent by weight, more preferably from about 2 to about 20 percent by weight, and most preferably from about 3 to about 15 percent by weight. The molecular weight of the water soluble anionically charged polymers used as scale inhibitors is preferably from about 500 to about 15,000, more preferably from about 750 to about 10,000, and most preferably from about 1,500 to about 7,500. In some embodiments, at least one scale inhibitor may be polyacrylic acid.

In another aspect of the method, from about 0.5 to about 25 percent by weight of a dispersant, wherein the dispersant, being different from the scale inhibitor, is a water soluble anionically charged polymer having a molecular weight of from about 13,000 to about 40,000 may be added to the composition. A more preferred range of dispersant in the composition is from about 1 to about 20 percent by weight, and most preferred from about 2 to about 10 percent by weight. A more preferable molecular weight of the dispersant is from about 15,000 to about 30,000, and most preferably from about 18,000 to about 20,000.

Alternatively, from about 0.1 to about 10 percent by weight of a substituted azole selected from the group consisting of: butyl benzyl triazole, tolyl triazole, mercaptobenzothiazole, and, benzotriazole, may be added to the composition. A more preferred range of a substituted azole is the composition is from about 0.5 to about 7 percent by weight, and most preferred range is from about 0.75 to about 4.5 percent by weight.

If deemed desirable, from about 1 to about 50 percent by weight of an alkali metal hydroxide calculated as NaOH may be added to the composition useful in the method taught by the invention. A more preferred range is from about 2 to about 40 percent by weight, and most preferred range is from about 5 to about 30 percent by weight.

Another aspect of the invention may include the addition from about 0.5 to about 25 percent by weight of a dispersant, wherein the dispersant, being different from the scale inhibitor, is a water soluble anionically charged polymer having a molecular weight of from about 13,000 to about 40,000, and from about 0.1 to about 10 percent by weight of a substituted azole selected from the group consisting of: butyl benzyl triazole, tolyl triazole, mercaptobenzothiazole, and, benzotriazole to the composition useful in the practice of the method.

An alternate aspect of the invention may include the addition from about 0.5 to about 25 percent by weight of a dispersant, wherein the dispersant, being different from the scale inhibitor, is a water soluble anionically charged polymer having a molecular weight of from about 13,000 to about 40,000, from about 0.1 to about 10 percent by weight of a substituted azole selected from the group consisting of: butyl benzyl triazole, tolyl triazole, mercaptobenzothiazole, and, benzotriazole, and from about 1 to about 50 percent by weight of an alkali metal hydroxide calculated as NaOH to the composition useful in the practice of the method.

The method may also include using a composition containing additional ingredients selected from the group including: substantially inert tracer; anti-foam compound; surfactant; and, biocide such as a stabilized halogen. The water soluble silicate salt added to the composition useful in the invention may be sodium silicate. A water soluble polymeric dispersant may be a copolymer of acrylic acid and acrylamide having a molecular weight of from about 13,000 to about 40,000 in the composition useful in the method disclosed as the invention.

Typical dosages for treating airwasher systems with the invention composition range from about 100 ppm to about 1,000 ppm, more preferably from about 150 ppm to about 800 ppm and most preferably from about 200 ppm to about 700 ppm. However, depending upon specific circumstances, the dosage may need to be adjusted outside of this range. Typical dosage ranges of the different constituents of the invention composition are provided below.

Organic (hydroxycarboxylic) acid: from about 5 ppm to about 1,000 ppm
Dispersant: from about 1 ppm to about 150 ppm
Silica: from about 5 ppm to about 50 ppm
Scale inhibitor: from about 2 ppm to about 30 ppm
Substituted azole: from about 0.1 ppm to about 5 ppm
Alkali metal hydroxide: from about 5 ppm to about 100 ppm
Surfactants: from about 1 ppm to about 15 ppm The Organic (hydroxycarboxylic) acid The organic (hydroxycarboxylic) acid component of the treatment program of the instant invention may be selected from the group consisting of gluconic acid, and other naturally derived polycarboxylic acids, as well as their water soluble salts. Other acids that can be used in this invention include adipic acid, succinic acid, tartaric acid, maleic acid, latic acid, citric acid, benzoic acid, mono-,di-and tri-substituted benzoic acid, phthalic acid, terephthalic acid, hydroxamic acid, isophthalic acid, malonic acid, as well as mixtures thereof.

In the practice of this invention, gluconic acid and its sodium salt, sodium gluconate are particularly preferred hydroxycarboxylic acids. The use of gluconic acid and its alkali metal or ammonium salts as a corrosion inhibitor is taught in U.S. Pat. No. 3,711,246 to Foroulis, the specification of which is incorporated herein by reference.

The alkali metal silicate

The water soluble silicate salts used in the present invention are the water soluble alkali metal and ammonium silicate salts. These may be represented generically by the formula $Na_2O.xSiO_2.yH_2O$ where x is the range of about 1 to about 3.5. Commercial sodium silicate solutions in which the mole ratio of silica to soda is about 3.3 may be used to advantage. More alkaline solutions having an $SiO_2:Na_2O$ mole ratio as low as about 1:1 or less alkaline solutions having an $SiO_2:Na_2O$ mole ratio up to about 3.5:1 can also be used. Sodium silicate solutions are available commercially from any number of suppliers. Other alkali metal salts of silicate, especially potassium silicate may also be employed in the compositions and methods of this invention. Combinations of silicate and gluconate are known to inhibit corrosion as taught in U.S. Pat. No. 3,711,246 cited above.

The biocide

Figure 9:
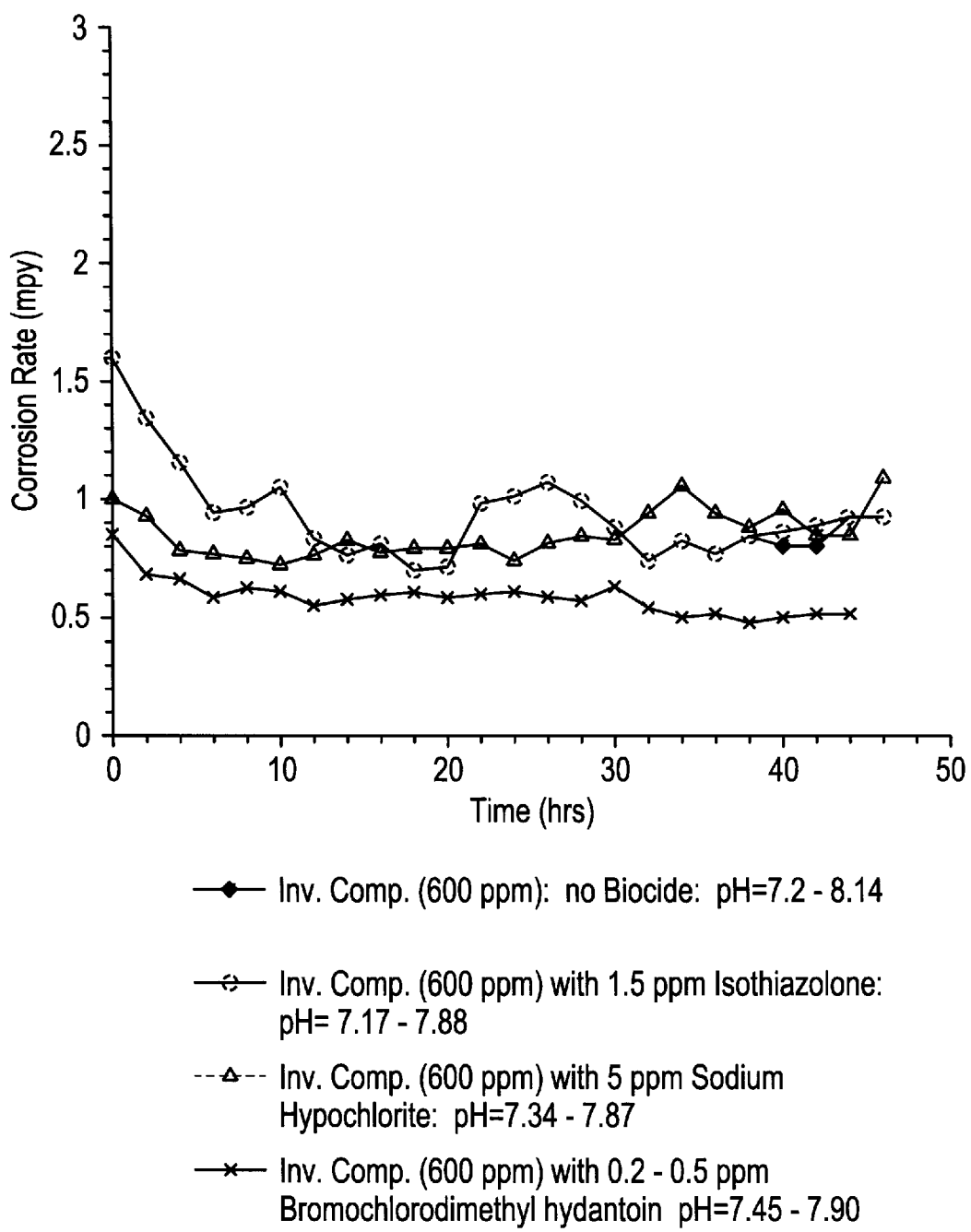
FIG. 9: A line graph showing the corrosion rate versus time for different of the invention composition.

In an alternative embodiment, a biocide may be added to the cooling water system in order to inhibit the growth of microbiological organisms which may lead to fouling of the system. Biocides may include, but are not limited to, isothiazolone, bleaches, and hydantoins. FIG. 9, discussed below, shows that no degradation in efficacy occurs for the invention composition. In the preferred embodiment, the biocide comprises a stabilized halogen compound including stabilized bromine, fluorine, iodine, and chlorine. An example is the stabilized alkali or alkaline earth metal hypobromite disclosed in U.S. Pat. No. 5,683,654.

The water soluble polymeric dispersants

The water soluble polymeric dispersants useful in this invention can be chosen from a broad range of water soluble polymeric materials. (The term polymer as used in this application shall mean polymer, co-polymer, ter-polymer, and so forth.) Among the useful materials are water soluble anionically charged polymers which have molecular weights ranging from about 13,000 to as much as 40,000, more preferably from about 15,000 to about 30,000, and most preferably from about 18,000 to about 20,000.

The polymers disclosed in U.S. Pat. No. 5,308,498 are useful in the practice of this invention, the specification of which is incorporated herein by reference. The preferred polymer is 50 to 60 mole percent of acrylic acid, 14 to 20 mole percent sulfomethylacrylamide, and 20 to 36 mole percent acrylamide.

Another useful polymer is acrylic acid and its alkali metal or ammonium salts. Other polymers which may be useful in the practice of this invention include those polymers of t-butyl acrylamide as disclosed in U.S. Pat. Nos. 4,566,973 and 4,744,949, the specifications of which are incorporated herein by reference. Polymers of (meth)acrylic acid and its water soluble salts, as well as anionically modified or derivitized acrylamide polymers may also be used in this invention.

The poly(meth)acrylic acid materials of this invention preferably will contain at least 20 weight percent acrylic or methacrylic acid or their respective water soluble alkali metal or ammonium salts, and preferably at least 50 weight percent acrylic or methacrylic acid. Most preferably, the poly(meth)acrylic acid materials when used as the dispersant polymer in this invention will contain greater than 75 weight percent (meth)acrylic acid or their respective water soluble alkali metal and ammonium salts.

The derivitized acrylamide polymers which are useful as the dispersant polymers in this invention and their use as additives to industrial cooling water are more fully set forth in U.S. Pat. No. 4,923,634, the specification of which is incorporated herein by reference. Known cooling water treatments containing polymers useful in this invention and methods of making such polymers include those disclosed in U.S. Pat. Nos. 4,604,431; 4,678,840; 4,680,339; 4,703,092; 4,752,443; 4,756,881; 4,762,894; 4,777,219; 4,801,388; 4,898,686; 4,923,634; 4,929,425; 5,035,806; 5,120,797; 5,143,622; and 5,179,173. Polymers may include acrylic acid-acrylamide copolymers and acrylic acid-acrylamide polymers which have been derivatized.

Of particular interest are those polymers which have been derivatized to include sulfomethylacrylamide. These polymers preferably have a molecular weight within the range of 7,000 to 100,000 and a mole ratio range of acrylic acid to acrylamide to 2-sulfomethylacrylamide of from 13 to 95 to 0 to 73 to 5 to 41. A preferred composition within the same species would have a molecular weight within the range of 10,000 to about 50,000 and a mole ratio of acrylic acid: acrylamide: 2-sulfomethylacrylamide of from 40 to 90: 0 to 50: 10 to 40. Other water soluble polymers useful in the practice of this subject invention are water soluble polymers prepared from anionic monomers such as those described in U.S. Pat. Nos. 4,490,308 and 4,546,156.

Other derivatized acrylamide-acrylic acid copolymers useful in this invention include those derivatized with species derivatives to include 2-sulfoethylacrylamide with a molecular weight of from 6,000 to 60,000 and a mole ratio within the range of acrylic acid (1 to 95), acrylamide (0 to 54) and 2-sulfoethylacrylamide (10 to 40). A polymer containing sulfoethyl acrylamide and with a molecular weight in the range of 10,000 to 40,000 and a mole ratio of acrylic acid (40 to 90), acrylamide (0 to 50), and 2-sulfoethylacrylamide (10 to 40) is also thought to be useful in the practice of this invention.

The scale inhibitors

The scale inhibitors useful in this invention can be chosen from a broad range of compounds and water soluble anionically charged polymers having molecular weights ranging from about 500 to about 15,000, more preferably from about 750 to about 10,000, and most preferably from about 1,500 to about 7,500. Exemplary water soluble polymers are formed from the polymerization of monomers of unsaturated carboxylic acids selected from the group consisting of acrylic acid, methacrylic acid, α-halo acrylic acid, maleic acid or anhydride, itaconic acid or anhydride, vinyl acetic acid, allyl acetic acid, fumaric acid, β-carboxyethyl acrylate, their salts, and mixtures thereof; and an unsaturated sulfonic acid selected from the group consisting of 2-acrylamido-2-methylpropyl sulfonic acid, 2-methacrylamido-2-methylpropylsulfonic acid, vinyl sulfonic acid, sulfoalkyl acrylate, sulfoalkyl methacrylate, allyl sulfonic acid, methallyl sulfonic acid, 3-methacrylamido-2-hydroxy-propyl sulfonic acid, sulfonic acid acrylate, their salts and mixtures thereof, said unsaturated carboxylic acid to said unsaturated sulfonic acid present in a ratio of from about 1:20 to about 20:1. A preferred polymer is polyacrylic acid.

While useful in all airwasher systems, the compositions of this invention are advantageously employed in systems utilizing water containing relatively low levels of calcium and magnesium ions. Such waters are known to be particularly corrosive to metal surfaces in contact therewith, and the subject composition has been found to have exceptional corrosion prevention properties when used in such systems. As stated above, the compositions of this invention may also be advantageously employed in systems containing typical levels of hardness causing ions to control corrosion and scale formation.

Other materials, such as substantially inert tracer materials, including inorganic materials and fluorescent dyes, and surfactants can be added to the composition of the present invention. Examples include molybdate, tungsten, boron, vanadium and similar materials. Surfactants include, but are not limited to, linear alkylbenzene sulfonates, like sodium dodecylbenzene sulfonate sold by Stepan under the tradename Biosoft D-40, or [decyl(sulfophenoxy) benzene sulfonic acid] disodium salt sold by Dow Chemical Company under the tradename Dowfax 3B2. The following example is presented to describe the various aspects and utilities of the invention and is not meant to limit the invention unless otherwise stated in the claims appended hereto.

EXAMPLE

In order to illustrate the efficacy of the compositions and method of the instant invention, the following experiments were conducted.

Mild steel cylinder electrodes were fabricated from a commercial ½ inch diameter AISI 1010 mild steel tube. The ½ inch length electrodes were polished by 600 grit emery paper and rinsed with acetone before each measurement.

The test solution, synthetic water, for the electrochemical corrosion cell was prepared by adding calcium, magnesium, various inhibitors, and bicarbonate to deionized water to obtain 23 ppm $Ca^{+2}$, 6 ppm $Mg^{+2}$, 20 ppm $HCO_3^-$ (all as $CaCO_3$). The experiments were conducted at ambient temperatures and the solution was aerated throughout the test period (12–56 hrs). The pH was uncontrolled for some of the experiments, but later tests incorporated adjusting the initial pH from 7.0–9.5 using dilute sulfuric acid.

A standard three electrode cell was assembled for the polarization studies. Pre-polished mild steel specimens were used as the rotating working electrode, at a speed of 160 rpm to simulate industrial metal surfaces under low flow conditions. All potential measurements were made against a saturated calomel reference electrode. Two graphite rods were used as the counter electrode. The rotated steel electrodes were then immersed in the test solution for 12–56 hours and data points/measurements were collected every 2 hours after immersion.

Polarization resistance measurements were conducted within±20 mV of the corrosion potential at a scan rate of 0.1 mV/sec. Later experiments substituted hot dipped galvanized steel specimens in place of the mild steel metallurgy. The linear polarization resistance electrochemical test provides a method to measure corrosion inhibition activity. This activity is reported as a corrosion rate, and the lower the corrosion rate, the better the composition is as a corrosion inhibitor.

FIGS. 1–7 show the corrosion rate of mild steel based on the performance of the present invention, a non-metal, non-phosphorus program. (The pHs listed on all of the Figures are pHs of the systems after the treatment agent, if any, was added). The present invention is also compared to two other programs. Program A is a cationic phosphate-surfactant blend treatment program. Program B is a phosphonate containing treatment program disclosed as in U.S. Pat. No. 5,589,106 incorporated herein by reference.

Program A is a cationic phosphate containing program:

The components of this program are as follows:

| | |
|---|---|
| water | 84.7% |
| acetic acid | 2.0% |
| tetrapotassium pyrophosphate ($K_4P_2O_7$); 60% in water | 4.3% |
| Triton CF-32, a surfactant alkylaminopolyethoxypolypropoxy-propanol available from Union Carbide through Van Waters & Rogers of Oak Brook, IL | 0.5% |
| Pluronic L-62, a non-ionic surfactant ethylene oxide/propylene oxide copolymer available from BASF, Mount Olive, NJ through ChemCentral, of Bedford Park, IL | 2.0% |
| Triton DF-16, a polyethoxylated alcohol, non-ionic surfactant available from Union Carbide through ChemCentral, of Bedford Park, IL | 0.5% |
| Monazoline CY (1-hydroxyethyl-2-heptylimidazoline), a fatty acid imidazoline available from Mona Industries of Paterson, NJ | 4.0% |
| Polyglycol E-200 | 2.0% |
| | 100% |

Program B is a soft water corrosion inhibitor package designed for cooling towers and contains the phosphonate PBTC.

The components of this program are as follows:

| | |
|---|---|
| water | 3.52% |
| sulfomethylated poly(acrylamide) available from Nalco Chemical Company, Naperville, IL | 9.0% |
| PBTC (phosphonobutane tricarboxylic acid) | 3.33% |
| gluconic acid | 20.0.% |
| sodium hydroxide | 20.66% |
| sodium silicate | 41.83% |
| sodium tolyltriazole | 1.33% |
| PTSA (pyrene tetrasulfonic acid) | 0.33% |
| | 100% |

Program C is another phosphate-containing program.
The components of this program are as follows:

| | |
|---|---|
| water | 63.2% |
| PTSA (pyrene tetra sulfonic acid) | 0.4% |
| sodium hydroxide | 10.1% |
| Pluronic L-62, a non-ionic surfactant ethylene oxide/propylene oxide copolymer available from BASF, Mount Olive, NJ through ChemCentral, of Bedford Park, IL | 1.9% |
| sodium tolyltriazole | 1.7% |
| HEDP (1-hydroxyethylidene-1,1-diphosphonic acid) | 2.7% |
| Diacid 1550, a surfactant monocyclic $C_{21}$ dicarboxylic fatty acid available from Westvaco Corp., of Charleston Heights, SC | 1.5% |
| PBTC (phosphonobutane tricarboxylic acid) | 4.6% |
| Triton DF-20: modified ethoxylate anionic surfactant available from Union carbide through ChemCentral, Bedford Park, IL | 2.1% |
| sulfomethylated poly(acrylamide) available from Nalco Chemical Company, Naperville, IL | 7.8% |
| Potassium vanadate | 4.0% |
| | 100% |

Program D is another phosphate-containing program.
The components of this program are as follows:

| | |
|---|---|
| water | 65.8% |
| PTSA (pyrene tetra sulfonic acid) | 0.4% |
| sodium hydroxide | 13.3% |
| Pluronic L-62, a non-ionic surfactant ethylene oxide/propylene oxide copolymer available from BASF, Mount Olive, NJ through ChemCentral, of Bedford Park, IL | 1.0% |
| sodium tolyltriazole | 1.2% |
| HEPD (1-hydroxyethylidene-1,1-diphosphonic acid) | 3.5% |
| Diacid 1550, a surfactant monocyclic $C_{21}$ dicarboxylic fatty acid available from Westvaco Corp., of Charleston Heights, SC | 2.0% |
| sodium molybdate dihydrate | 2.6% |
| sulfomethylated poly(acrylamide) available from Nalco Chemical Company, Naperville, IL | 6.2% |
| Potassium vanadate | 4.0% |
| | 100% |

Inv. Comp. (Inventive Composition) is the inventive non-phosphorus, non-metal program; a soft water corrosion inhibitor package designed for airwasher systems (textile).

The components of this program are as follows:

| | |
|---|---|
| water | 23.78% |
| sulfomethylated poly(acrylamide) available from Nalco Chemical Company, Naperville, IL | 4.5% |
| polyacrylic acid (45%) | 6.0% |
| gluconic acid | 20.0% |
| sodium hydroxide | 20.66% |
| sodium silicate | 20.9% |
| sodium tolyltriazole | 1.33% |
| PTSA (pyrenetetra sulfonic acid) | 0.33% |
| potassium vanadate | 2.5% |
| | 100% |

Each of these programs is available from Nalco Chemcial Company of Naperville, Ill.

FIG. 1 compares the performance of a blank (containing no treatment program) and Program A to the present invention composition (containing an inert tracer) in synthetic soft water. The blank and Program A at 100 ppm and 200 ppm concentrations resulted in corrosion rates of approximately 2 mpy or more. The application of the invention, tested at 200 ppm, 400 ppm, and 600 ppm concentrations, resulted typically in less than 1 mpy. No pH adjustments were made in any of these tests.

FIGS. 2–7 show the pH and dosage profile of the present invention composition and Program B. Dilute sulfuric acid was used to make the initial pH adjustment prior to starting the electrochemical tests.

Figure 2:
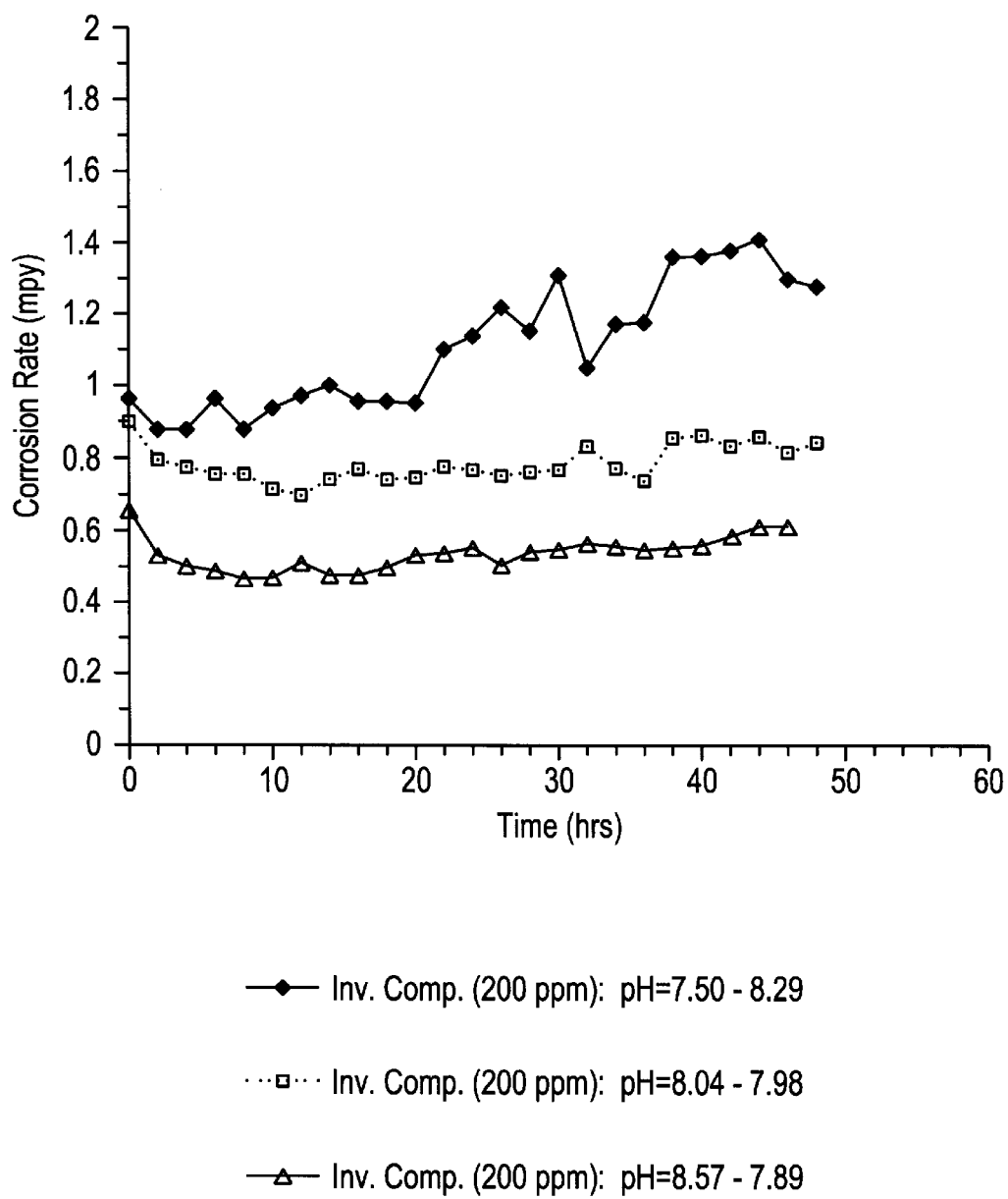
FIG. 2: A line graph showing the mild steel corrosion rates at different pH values with the application of the invention composition at a concentration of 200 ppm.

FIG. 2 shows that a concentration of 200 ppm of the invention composition is affected by the pH of the aqueous fluid. The higher the pH, the lower the corrosion rate. Between pHs from about 8.0 to about 8.6, corrosion rates obtained showing excellent corrosion protection, were from about 0.5 to about 0.8 mpy. Slightly higher rates from about 1.0 to about 1.3 mpy were obtained at a pH of about 7.5

Figure 3:
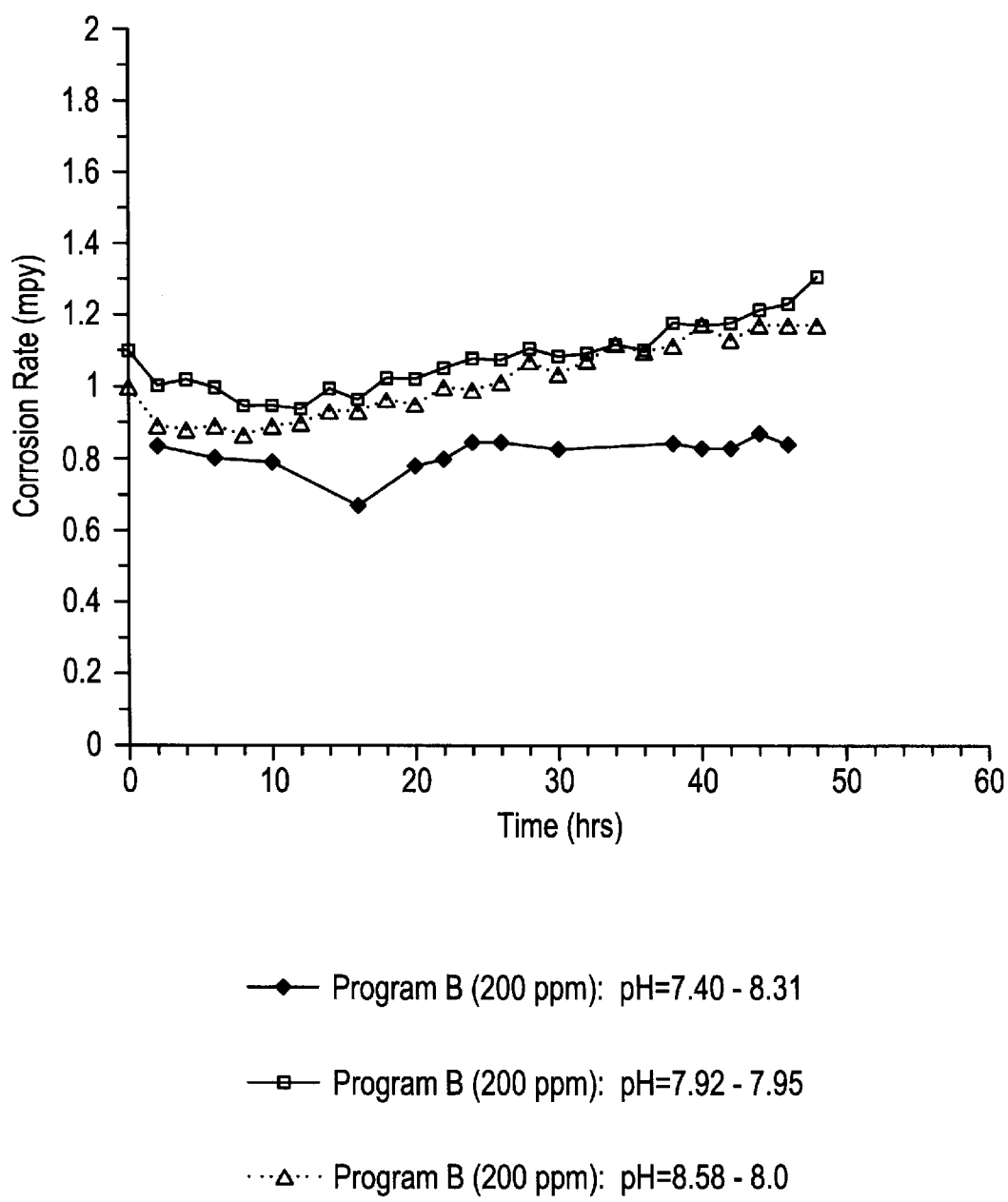
FIG. 3: A line graph showing the mild steel corrosion rates at different pH values with the application of Program B at a concentration of 200 ppm.

FIG. 3 shows that the Program B, containing phosphorus, resulted in corrosion rates from about 0.8 to about 1.2 mpy at a concentration of 200 ppm within a pH range from about 7.4 to about 8.6.

Figure 4:
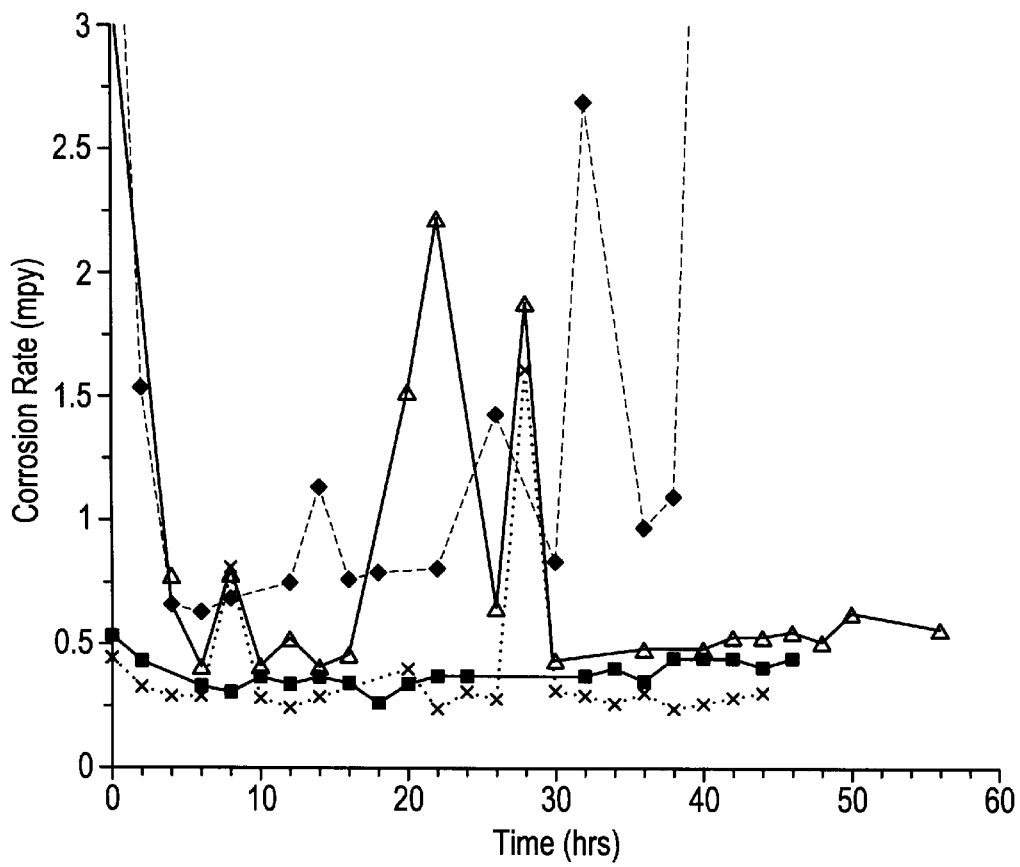
FIG. 4: A line graph showing the mild steel corrosion rates at different pH values with the application of the invention composition at a concentration of 400 ppm.
Figure 5:
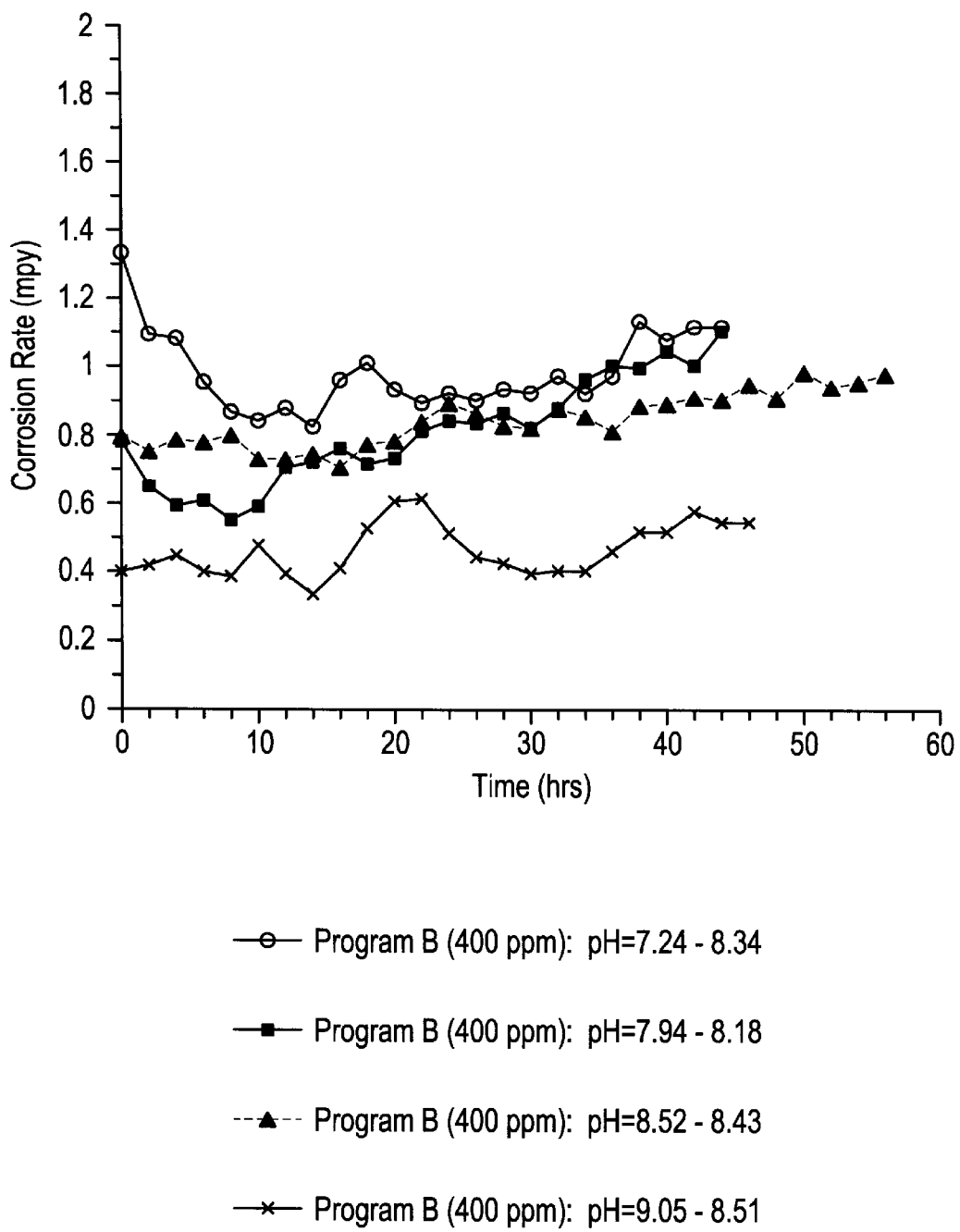
FIG. 5: A line graph showing the mild steel corrosion rates at different pH values with the application of Program B at a concentration of 400 ppm.

As shown in FIGS. 4 and 5, increasing the invention composition concentration and Program B concentration to 400 ppm, over a pH range from about 7.5 to about 9.0, results in reduced corrosion rates. The spikes in the curve at pH 7.5 in FIG. 4 are the result of film formation and subsequent slight breakdown of the film. Treatment programs which contain phosphates and phosphonates are known to provide corrosion protection through the formation of a film barrier.

Figure 6:
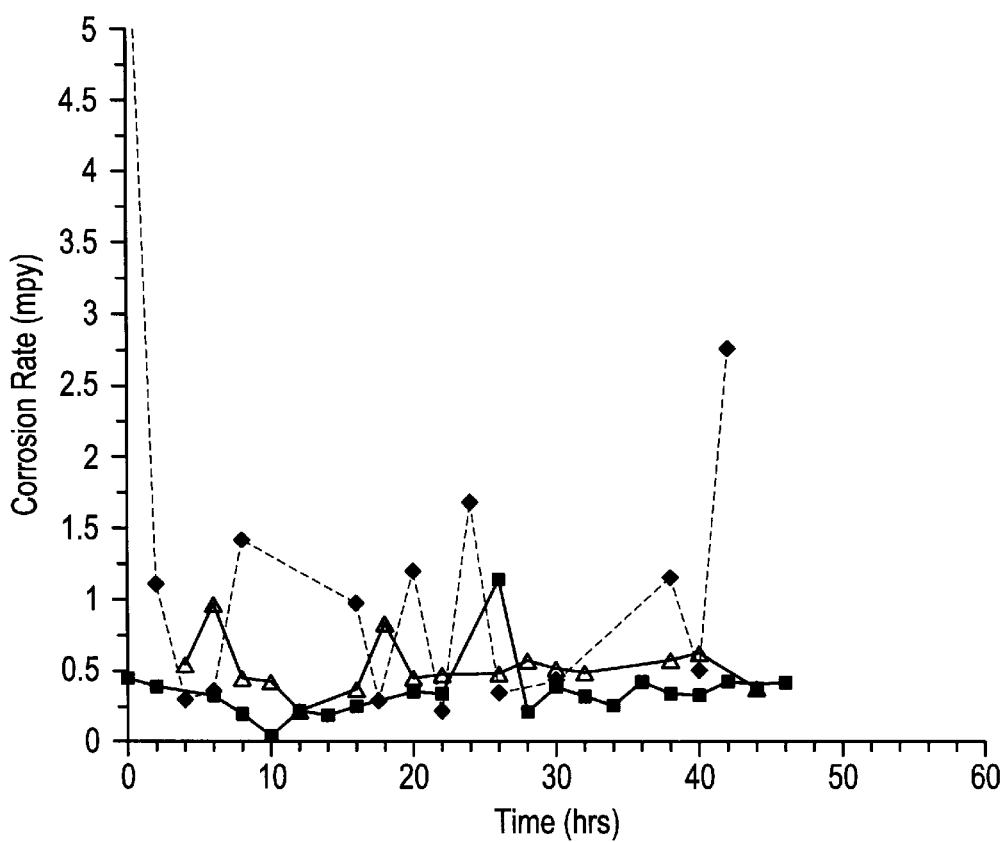
FIG. 6: A line graph showing the mild steel corrosion rates at different pH values with the application of the invention composition at a concentration of 600 ppm.
Figure 7:
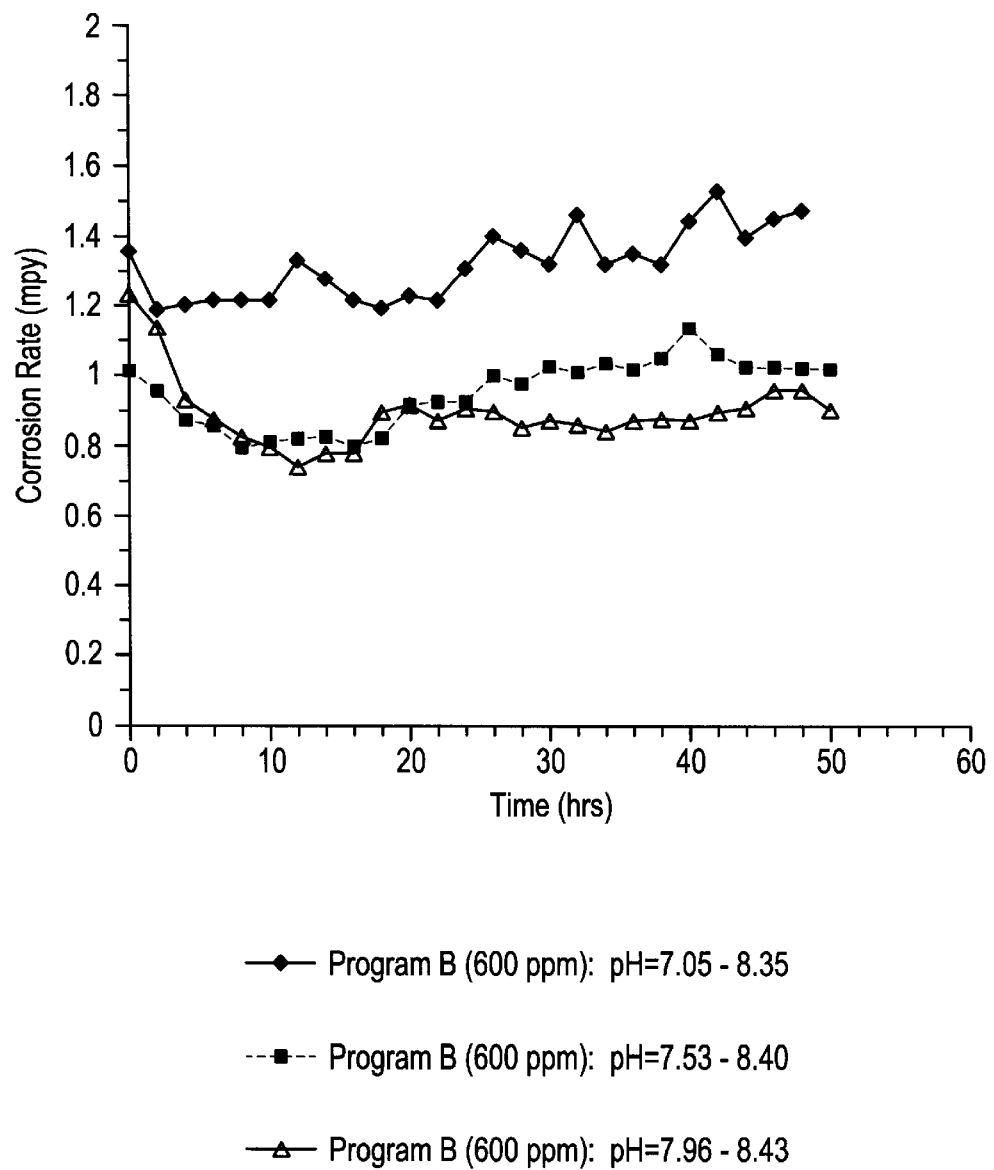
FIG. 7: A line graph showing the mild steel corrosion rates at different pH values with the application of Program B at a concentration of 600 ppm.

FIGS. 6 and 7 show the mild steel corrosion rate performance at pHs between about 7.0 to about 8.0 using 600 ppm concentrations of the invention composition or Program B. Even at a pH of 7.5, treatment with the invention composition resulted in corrosion rates of approximately 0.5 mpy while similar treatment using Program B at a pH of 7.5 resulted in corrosion rates ranging from about 0.8 to about 1.1 mpy.

Figure 8:
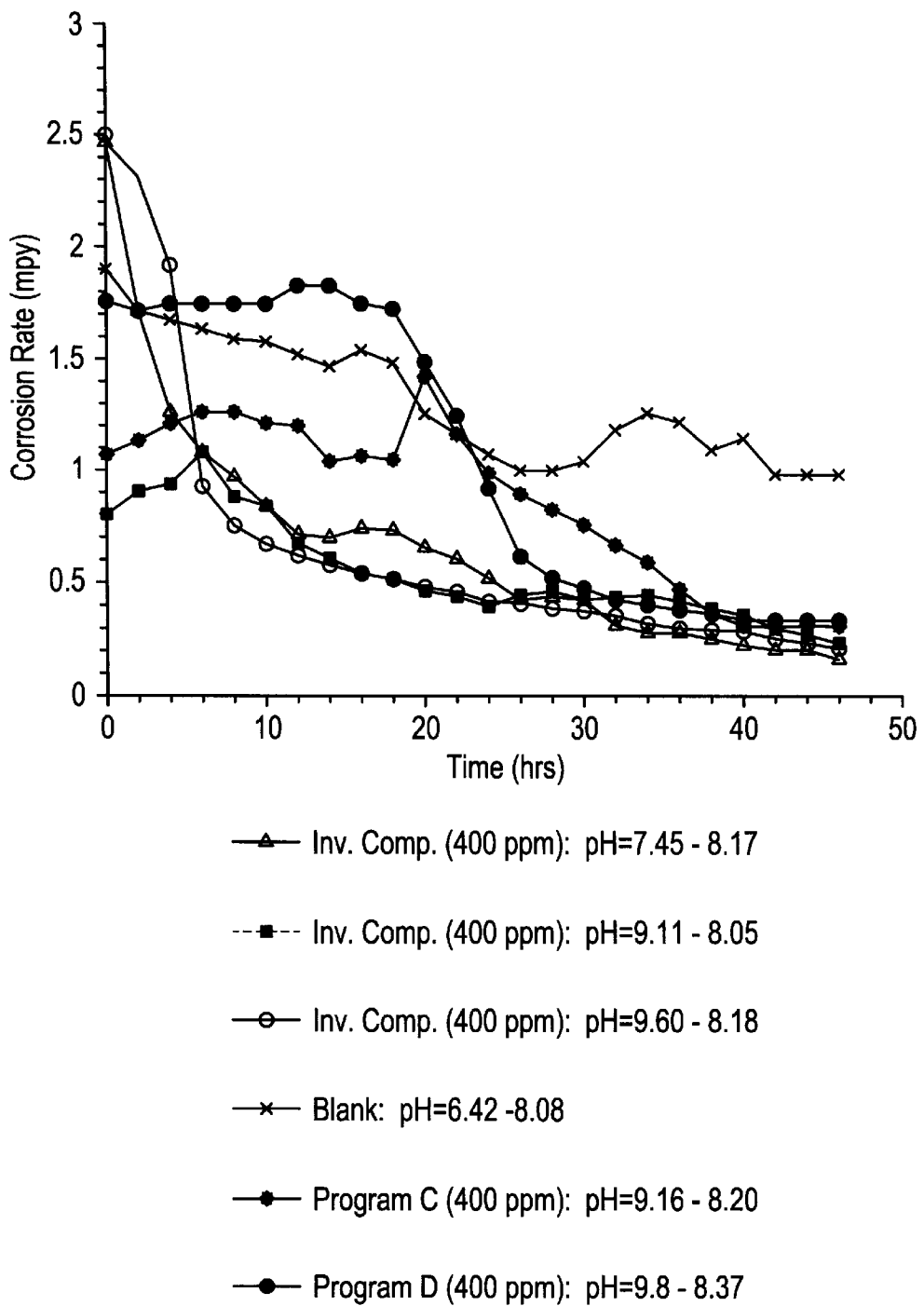
FIG. 8: A line graph showing the galvanized steel corrosion rates at different pH values with the separate applications of a blank, the invention composition, Program C, and Program D at concentrations of 400 ppm.

FIG. 8 shows the corrosion inhibition of the invention composition compared to Program C and Program D on hot dipped galvanized steel. Program C is a similar formulation to Program B, a non-metal treatment but contains two phosphonates as part of the formulation. Program D is a different formulation that does not contain phosphorus but does contain however, a metal, molybdate.

Comparing the performances of the invention composition, Program C, and Program D, each tested separately at a concentration of 400 ppm, it is seen that the invention composition out performed both Program C and Program D. Tests utilizing Programs C and D were conducted in synthetic water under the same conditions described above as used for Programs A and B. The pH was uncontrolled on the tests of Program C and Program D.

FIG. 9 shows that the addition of different biocides does not effect the effectiveness of the invention composition. Several biocides were tried including sodium hypochlorite (bleach), bromochlorodimethylhydantoin, and isothiazolone.

The invention composition is made/prepared in a stainless, steel blender. Water, the dispersant if desired, the polymeric scale inhibitor, and the organic hydroxycarboxylic acid is added together with mixing. No cooling is necessary at this point. Next, if necessary, caustic is added to the blender, applying cooling during the mixing. Temperature of the batch should be kept below 130 to 140° F. The silicate, and if desired, substituted triazole corrosion inhibitors, surfactants and inert tracers, are added at this point. Mixing is continued for approximately 15 additional minutes. A pH of 12 or greater is necessary to provide physical stability for the yellow metal, substituted triazole corrosion inhibitor in the composition. The pH of 12 or greater keeps the composition uniform and improves the end product's appearance.

Changes can be made in the composition, operation and arrangement of the method of the present invention described herein without departing from the concept and scope of the invention as described in the following claims:

We claim:

1. A method for the control of corrosion on metallic surfaces in contact with an aqueous fluid of an airwasher system which comprises adding and maintaining an effective corrosion controlling amount of the composition comprising:
   a. from about 2 to about 50 percent by weight of an organic acid selected from the group consisting of: adipic acid, gluconic acid, succinic acid, tartaric acid, maleic acid, lactic acid, citric acid, benzoic acid, mono-, di-, and tri-substituted benzoic acid, phthalic acid, terephthalic acid, isophthalic acid, malonic acid, and mixtures thereof;
   b. from about 2 to about 50 percent by weight of a component selected from the group consisting of water soluble alkali metal silicate salts and water soluble ammonium silicate salts calculated as $SiO_2$;
   c. from about 1 to about 30 percent by weight of at least one polymeric scale inhibitor which is a water soluble anionically charged polymer having a molecular weight of from about 500 to about 15,000;
   d. the balance thereof being water.

2. The method of claim 1 further comprising the step of adding from about 0.5 to about 25 percent by weight of a polymeric dispersant, wherein said dispersant, being different from the scale inhibitor, is a water soluble anionically charged polymer having a molecular weight of from about 13,000 to about 40,000 to said fluid.

3. The method of claim 1 further comprising the step of adding from about 0.1 to about 10 percent by weight of a substituted azole selected from the group consisting of: butyl benzyl triazole, tolyl triazole, mercaptobenzothiazole and benzotriazole to said fluid.

4. The method of claim 1 further comprising the step of adding from about 1 to about 50 percent by weight of an alkali metal hydroxide calculated as NaOH to said fluid.

5. The method of claim 2 further comprising the step of adding from about 0.1 to about 10 percent by weight of a substituted azole selected from the group consisting of: butyl benzyl triazole, tolyl triazole, mercaptobenzothiazole and benzotriazole to said fluid.

6. The method of claim 5 further comprising the step of adding from about 1 to about 50 percent by weight of an alkali metal hydroxide calculated as NaOH to said fluid.

7. The method of claim 1 wherein the water soluble silicate salt is sodium silicate.

8. The method of claim 2 wherein said polymeric dispersant is a copolymer of acrylic acid and acrylamide having a molecular weight of from about 13,000 to about 40,000.

9. The method of claim 1 further comprising the step of adding at least one of the additional ingredients selected from the group consisting of substantially inert tracers, anti-foamants, surfactants and microbiocides to said fluid.

10. The method of claim 9 wherein said microbiocide is a stabilized halogen compound.

11. The method of claim 2 wherein said polymeric dispersant is derived from at least one of the monomers selected from the group consisting of acrylamide, acrylic acid, 2-sulfomethyl-acrylamide and combinations thereof.

12. The method of claim 1 wherein one of said polymeric scale inhibitors is polyacrylic acid.

* * * * *